(12) United States Patent
Glugla et al.

(10) Patent No.: US 6,415,601 B1
(45) Date of Patent: Jul. 9, 2002

(54) TEMPERATURE MANAGEMENT OF CATALYST SYSTEM FOR A VARIABLE DISPLACEMENT ENGINE

(75) Inventors: Christopher P. Glugla, Macomb; John Ottavio Michelini, Sterling Heights, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/732,262

(22) Filed: Dec. 7, 2000

(51) Int. Cl.⁷ .................................................. F01N 3/00
(52) U.S. Cl. .......................................... 60/284; 60/274
(58) Field of Search ........................... 60/274, 277, 284, 60/285, 286

(56) References Cited

U.S. PATENT DOCUMENTS

| | | | |
|---|---|---|---|
| 4,134,261 A | * | 1/1979 | Iizuka et al. .................... 60/277 |
| 4,165,610 A | * | 8/1979 | Iizuka et al. .................... 60/285 |
| 4,467,602 A | | 8/1984 | Iizuka et al. |
| 5,437,253 A | | 8/1995 | Huffmaster et al. |
| 5,460,129 A | | 10/1995 | Miller et al. |
| 5,490,486 A | | 2/1996 | Diggs |
| 5,497,745 A | | 3/1996 | Cullen et al. |
| 5,540,202 A | | 7/1996 | Cullen et al. |
| 5,600,947 A | | 2/1997 | Cullen |
| 5,653,102 A | | 8/1997 | Orzel et al. |
| 5,711,387 A | | 1/1998 | Murata et al. |
| 5,722,236 A | | 3/1998 | Cullen et al. |
| 5,758,493 A | * | 6/1998 | Asik et al. ...................... 60/274 |
| 5,956,941 A | | 9/1999 | Cullen et al. |
| 5,970,943 A | | 10/1999 | Robichaux et al. |
| 6,023,929 A | * | 2/2000 | Ma .............................. 60/285 |
| 6,164,065 A | * | 12/2000 | Denari et al. .................. 60/284 |
| 6,237,330 B1 | * | 5/2001 | Takahashi et al. ............. 60/285 |

* cited by examiner

Primary Examiner—Thomas Denion
Assistant Examiner—Tu M. Nguyen
(74) Attorney, Agent, or Firm—Allan J. Lippa

(57) ABSTRACT

A system and method for controlling an internal combustion engine having a plurality of cylinders, at least some of which may be selectively deactivated to provide variable displacement operation, include managing temperature of at least one engine/vehicle component by monitoring the temperature of the component and controlling activation of at least one cylinder to control the temperature of the component. In one embodiment, the engine/vehicle component is an emission control device, such as a catalytic converter.

1 Claim, 3 Drawing Sheets

TEMPERATURE MANAGEMENT OF CATALYST SYSTEM FOR A VARIABLE DISPLACEMENT ENGINE

BACKGROUND OF THE INVENTION

1. Field of the Invention

The present invention relates to a system and method for controlling a variable displacement engine to manage temperature of a catalyst system.

2. Background Art

Fuel economy for a multi-cylinder internal combustion engine can be improved by deactivating some of the engine cylinders under certain operating conditions. Reducing the number of operating cylinders reduces the effective displacement of the engine such that it is sometimes referred to as a variable displacement engine. Depending upon the particular configuration of the variable displacement engine, one or more cylinders may be selectively deactivated to improve fuel economy under light load conditions. In some configurations, a group of cylinders, which may be an entire bank of cylinders, is selectively deactivated.

Reducing the number of operating cylinders may also reduce the operating temperature of various engine and/or vehicle components which may adversely affect desired engine operation. For example, certain emission control devices, such as catalytic converters, require a minimum operating temperature for efficient operation. One approach to raise catalyst temperature involves enriching the fuel supply to the operating cylinders when catalyst temperature drops below a specified level as disclosed in U.S. Pat. No. 4,467,602. This method assumes that excess air is available in the catalytic converter to be effective. The inventors herein have recognized that this assumption may not always be valid and may result in reduced catalyst and/or engine efficiency during certain operating conditions.

SUMMARY OF THE INVENTION

An object of the present invention is to provide a system and method for controlling a variable displacement internal combustion engine to effectively manage the temperature of one or more engine and/or vehicle components.

In carrying out the above object and other objects, advantages, and features of the invention, a system and method for controlling a variable displacement internal combustion engine include controlling the number or ratio of active/inactive cylinders to control the temperature of at least one engine or vehicle component. In one preferred embodiment, the system and method include controlling a variable displacement engine having a bank configuration with a close-coupled catalyst associated with each bank of cylinders and at least one downstream or underbody catalyst by activating the second bank of cylinders when one of the catalysts is determined to be near or below a minimum efficient operating temperature.

The present invention provides a number of advantages. For example, the present invention manages the temperature of one or more engine/vehicle components to maintain a desired operating efficiency while also efficiently operating the engine.

The above advantage and other advantages, objects, and features of the present invention will be readily apparent from the following detailed description of the preferred embodiments when taken in connection with the accompanying drawings.

DETAILED DESCRIPTION OF THE PREFERRED EMBODIMENT(S)

Figure 1:
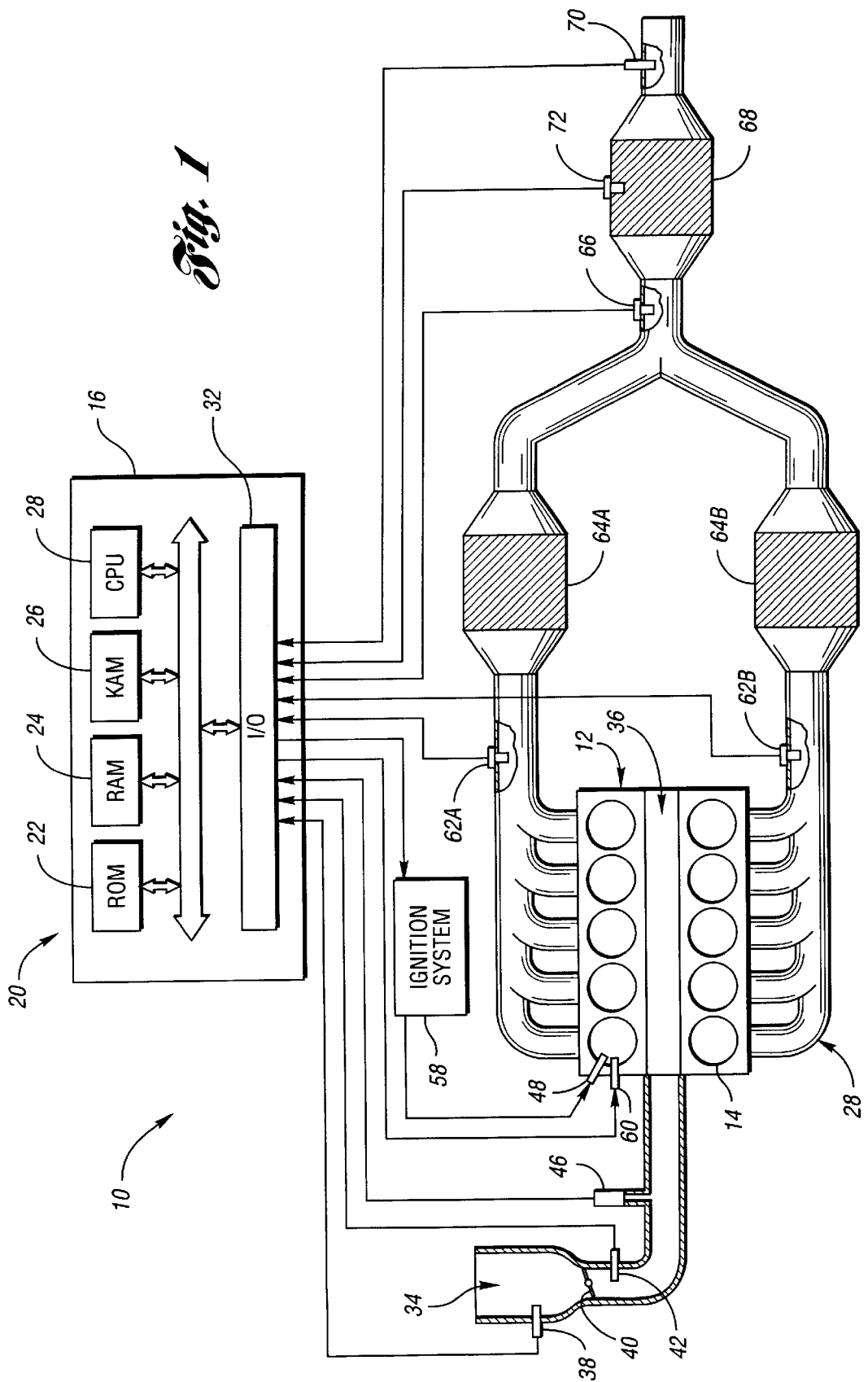
FIG. 1 is a block diagram illustrating operation of one embodiment for a system or method for controlling a variable displacement engine according to the present invention.

A block diagram illustrating an engine control system for a representative internal combustion engine operable in a variable displacement mode to manage temperature of an engine/vehicle component according to the present invention is shown in FIG. 1. System 10 preferably includes an internal combustion engine 12 having a plurality of cylinders, represented by cylinder 14. In one preferred embodiment, engine 12 includes ten cylinders arranged in a "V" configuration having two cylinder banks with five cylinders each. As used herein, a cylinder bank refers to a related group of cylinders having a common characteristic, such as being located proximate one another, having a common emission control device (ECD), or related according to firing order, for example. As such, cylinder banks can also be defined for in-line cylinder configurations as well.

As one of ordinary skill in the art will appreciate, system 10 includes various sensors and actuators to effect control of the engine. One or more sensors or actuators may be provided for each cylinder 14, or a single sensor or actuator may be provided for the engine. For example, each cylinder 14 may include four actuators which operate corresponding intake and exhaust valves, while only including a single engine coolant temperature sensor.

System 10 preferably includes a controller 16 having a microprocessor 18 in communication with various computer-readable storage media, indicated generally by reference numeral 20. The computer readable storage media preferably include a read-only memory (ROM) 22, a random-access memory (RAM) 24, and a keep-alive memory (KAM) 26. As known by those of ordinary skill in the art, KAM 26 is used to store various operating variables while controller 16 is powered down but is connected to the vehicle battery. Computer-readable storage media 20 may be implemented using any of a number of known memory devices such as PROMS, EPROMS, EEPROMS, flash memory, or any other electric, magnetic, optical, or combination memory device capable of storing data, some of which represents executable instructions, used by microprocessor 18 in controlling the engine. Microprocessor 18 communicates with the various sensors and actuators via an input/output (I/O) interface 32. Of course, the present invention could utilize more than one physical controller, such as controller 16, to provide engine/vehicle control depending upon the particular application.

In operation, air passes through intake 34 where it may be distributed to the plurality of cylinders via an intake manifold, indicated generally by reference numeral 36. System 10 preferably includes a mass airflow sensor 38 which provides a corresponding signal (MAF) to controller 16 indicative of the mass airflow. If no mass airflow sensor is present, a mass airflow value may be inferred from various engine operating parameters. A throttle valve 40 may be used to modulate the airflow through intake 34 during certain operating modes. Throttle valve 40 is preferably electronically controlled by an appropriate actuator 42 based on a corresponding throttle position signal generated by controller 16. A throttle position sensor provides a feedback signal (TP) indicative of the actual position of throttle valve 40 to controller 16 to implement closed loop control of throttle valve 40.

As illustrated in FIG. 1, a manifold absolute pressure sensor 46 may be used to provide a signal (MAP) indicative of the manifold pressure to controller 16. Air passing through intake 34 enters the combustion chambers or cylinders 14 through appropriate control of one or more intake valves. The intake and exhaust valves may be controlled directly or indirectly by controller 16 along with ignition timing (spark) and fuel to selectively activate/deactivate one or more cylinders 12 to provide variable displacement operation. A fuel injector 48 injects an appropriate quantity of fuel in one or more injection events for the current operating mode based on a signal (FPW) generated by controller 16 processed by an appropriate driver. Control of the fuel injection events is generally based on the position of the pistons within respective cylinders 14. Position information is acquired by an appropriate crankshaft sensor which provides a position signal (PIP) indicative of crankshaft rotational position. At the appropriate time during the combustion cycle, controller 16 generates a spark signal (SA) which is processed by ignition system 58 to control spark plug 60 and initiate combustion within an associated cylinder 14.

Controller 16 (or a camshaft arrangement) controls one or more exhaust valves to exhaust the combusted air/fuel mixture of activated or running cylinders through an associated exhaust manifold, indicated generally by reference numeral 28. Depending upon the particular engine configuration, one or more exhaust manifolds may be used. In one preferred embodiment, engine 12 includes an exhaust manifold 28 associated with each bank of cylinders as illustrated in FIG. 1.

An exhaust gas oxygen sensor 62 is preferably associated with each bank of cylinders and provides a signal (EGO) indicative of the oxygen content of the exhaust gases to controller 16. The present invention is independent of the particular type of exhaust gas oxygen sensor utilized, which may depend on the particular application. In one embodiment, heated exhaust gas oxygen sensors (HEGO) are used. of course, various other types of air/fuel ratio sensors/indicators may be used such as a universal exhaust gas oxygen sensor (UEGO), for example. The exhaust gas oxygen sensor signals may be used to independently adjust the air/fuel ratio, or control the operating mode of one or more cylinders or banks of cylinders. The exhaust gas passes through the exhaust manifolds 28 through associated upstream emission control devices 64A and 64B which may be catalytic converters, for example. After passing through the associated upstream ECDs, the exhaust gas is combined and flows past an underbody exhaust gas oxygen sensor 66 and through a downstream emission control device 68 before flowing past a catalyst monitoring sensor 70 (typically another exhaust gas oxygen sensor) and being exhausted to atmosphere.

A temperature sensor 72 may be provided to monitor the temperature of a catalyst within emission control device 68, depending upon the particular application. Alternatively, the temperature may be estimated using an appropriate temperature model based on various other sensed engine/vehicle parameters which may include mass airflow, manifold absolute pressure or load, engine speed, air temperature, engine coolant temperature, and/or engine oil temperature, for example. A representative temperature model could be developed to determine catalyst temperature for any one of the emission control devices 64A, 64B and/or 68 using various sensed and estimated engine operating parameters as described in U.S. Pat. No. 5,956,941, for example.

According to the present invention, controller 16 manages temperature of one or more engine/vehicle components, such as emission control devices 64A, 64B, and/or 68 by controlling activation/deactivation of one or more cylinders. In a preferred embodiment, engine 12 is a V-10 engine with variable displacement operation provided by selectively deactivating one bank of cylinders under appropriate engine and/or vehicle operating conditions, such as light load, for example. The deactivated cylinder bank may then be selectively activated to maintain efficient operation of one or more emission control devices. For example, the second cylinder bank may be reactivated to maintain the temperature of emission control device 68 sufficiently above the catalyst light-off temperature to maintain efficient operation. The cylinder bank is then deactivated after the temperature exceeds a corresponding threshold to provide hysteresis, or to reduce the operating temperature to prolong component life, for example, as explained in greater detail below.

Figure 2:
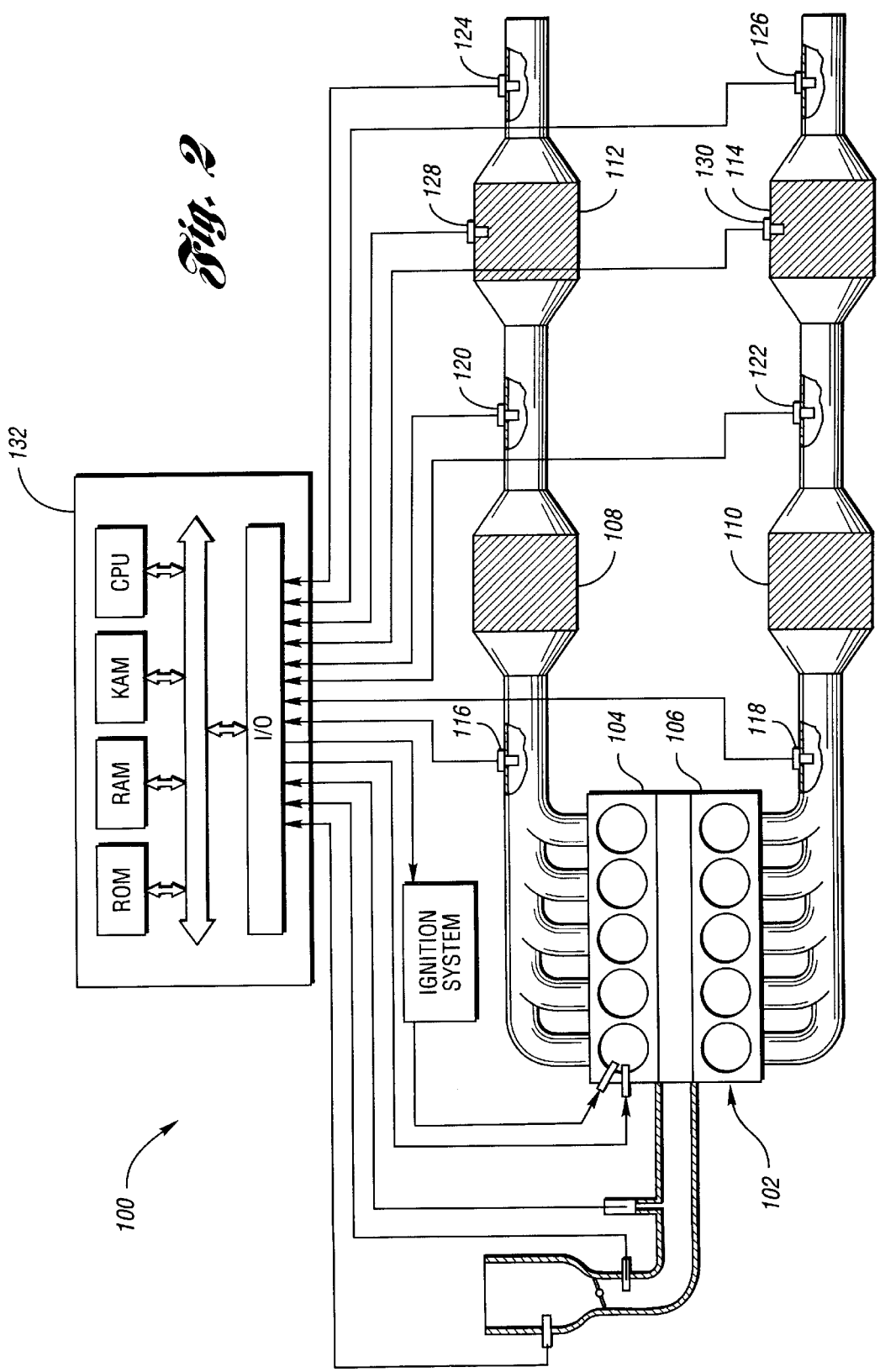
FIG. 2 is a block diagram illustrating operation of another embodiment for a system or method for controlling a variable displacement engine according to the present invention.

Referring now to FIG. 2, an alternative embodiment for controlling a variable displacement engine to manage temperature of an engine/vehicle component according to the present invention is shown. As will be recognized by those of ordinary skill in the art, system 100 includes similar components as described with reference to the embodiment illustrated in FIG. 1 and incorporated here by reference. Internal combustion engine 102 includes two cylinder banks 104, 106. Each cylinder bank includes an associated upstream or close-coupled emission control device 108 and 110, respectively. In addition, rather than combining the exhaust and using a common third emission control device as illustrated in FIG. 1, each bank 104, 106 also has an associated downstream or underbody emission control device 112, 114, respectively. In one embodiment, the emission control devices 108, 110, 112, and 114 are three-way catalysts.

As also illustrated in FIG. 2, each ECD has an associated exhaust gas oxygen sensor 116, 118, 120, 122, respectively, which are preferably HEGO sensors. Additional exhaust gas oxygen sensors 124, 126 may be provided downstream relative to downstream ECDs 112, 114, respectively, to provide a conversion efficiency indication and monitor operation of the emission control devices. Downstream ECDs 112, 114 preferably include associated temperature sensors 128, 130 to provide an indication of the catalyst temperature which may be used by controller 132 to manage the temperature of one or more of the ECDs as described herein. It should be recognized by those of ordinary skill in the art that the temperature of one or more engine/vehicle components can be modeled as described above with reference to the embodiment illustrated in FIG. 1. Component temperature modeling may be used alone or in combination with one or more temperature sensors to provide temperature management according to the present invention. One of ordinary skill in the art will also recognize that a variety of engine/vehicle operating parameters influence the current operating mode and selective activation/deactivation of one or more cylinders to provide variable displacement operation. These parameters may affect or override the decision to activate/deactivate cylinders to provide the temperature management features in accordance with the present invention.

Figure 3:
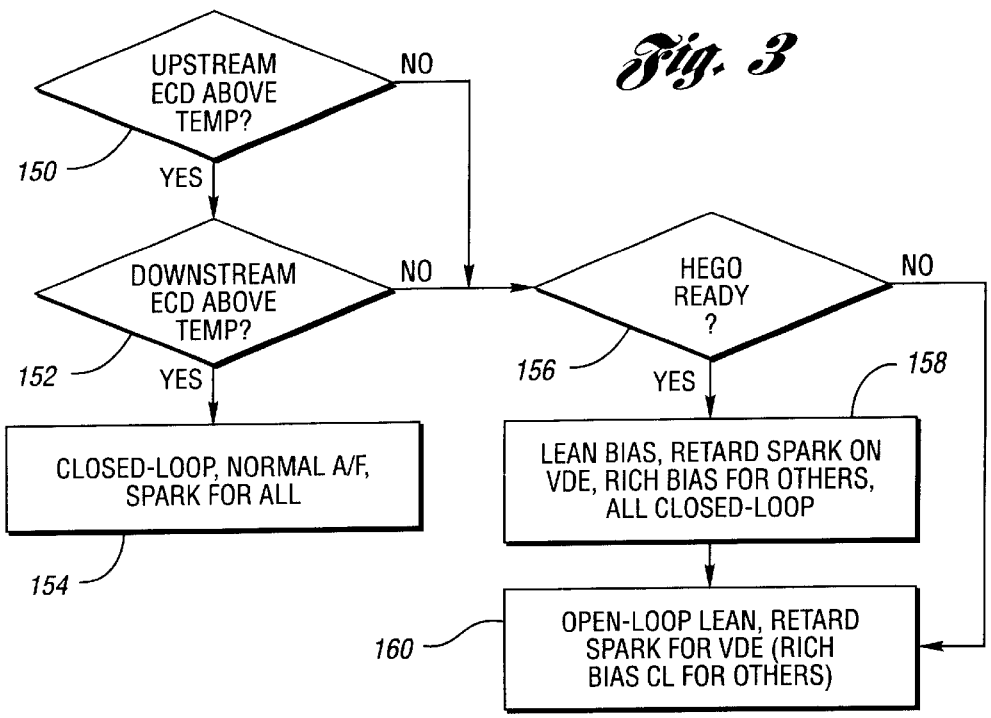
FIG. 3 is a logic diagram illustrating a reactivation strategy for cylinders of a variable displacement engine to manage component temperature according to one embodiment of the present invention.
Figure 4:
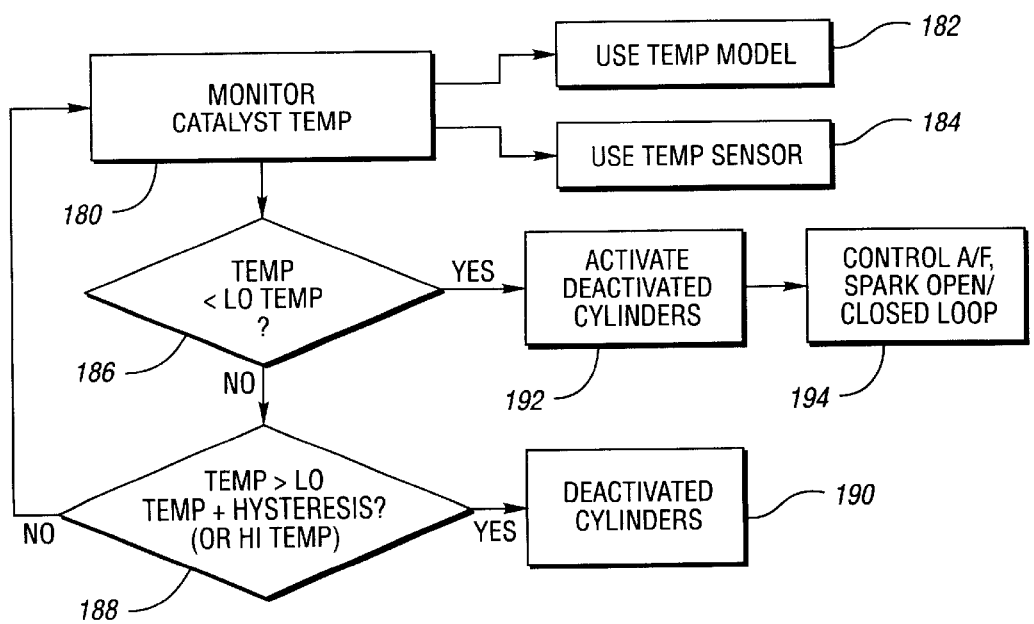
FIG. 4 is a flow diagram illustrating operation of one embodiment for a system or method for controlling a variable displacement engine according to the present invention.

The diagrams of FIGS. 3 and 4 generally represent control logic for one embodiment of a system or method according to the present invention. As will be appreciated by one of ordinary skill in the art, the diagrams may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one of ordinary skill in the art will recognize that one or more of the illustrated steps or functions may be repeatedly performed depending upon the particular processing strategy being used.

Preferably, the control logic is implemented primarily in software executed by a microprocessor-based engine controller. Of course, the control logic may be implemented in software, hardware, or a combination of software and hardware depending upon the particular application. When implemented in software, the control logic is preferably provided in a computer-readable storage medium having stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, and the like.

Block 150 of FIG. 3 represents monitoring of at least one engine or vehicle component such as an emission control device (ECD). In this embodiment, block 150 determines whether an upstream ECD is above a corresponding or associated temperature threshold. For example, the temperature threshold may correspond to be light-off temperature of a three-way catalyst. Block 152 determines whether a downstream ECD is above a corresponding temperature. The downstream ECD may be associated with a single upstream device, as illustrated in FIG. 2, or shared by multiple upstream devices as illustrated in FIG. 1. If the upstream ECD is above the corresponding temperature threshold as determined by block 150 and the downstream ECD is above its associated temperature threshold as determined by block 152, all cylinders are operated under closed-loop control with a normal scheduled air/fuel ratio and spark or ignition timing as represented by block 154.

If the upstream component is below its associated temperature threshold as indicated by block 150, or the downstream component is below its associated temperature threshold as indicated by block 152, block 156 determines whether an associated exhaust gas oxygen sensor is available in providing information sufficient to operate closed-loop. In this particular embodiment, block 156 determines whether an associated HEGO sensor has reached an appropriate operating temperature to provide reliable information with respect to the oxygen content of the exhaust gas. If the associated HEGO is ready for closed-loop operation as determined by block 156, the previously deactivated cylinders are activated with a lean bias on the air/fuel ratio and spark retarded from MBT. The previously running or activated cylinders are operated with a rich bias air/fuel ratio. All cylinders are operated using closed-loop control of air/fuel ratio based on the HEGO sensor reading with appropriate lean/rich bias as represented by block 158. In one embodiment, an entire bank of cylinders is activated and operated with a lean bias and retarded spark until the downstream ECD reaches its temperature threshold as determined by block 152.

If the HEGO sensor associated with the ECD is not ready for closed-loop operation as determined by block 156, the engine is controlled to activate the deactivated cylinders and operate them open-loop with a lean air/fuel ratio and spark retarded from MBT as represented by block 160. The previously activated or running cylinders are operated with a rich bias air/fuel ratio in closed-loop mode.

FIG. 4 provides an alternative representation of operation for a system or method to manage temperature of an engine/vehicle component according to the present invention. Block 180 represents monitoring of at least one catalyst temperature using a temperature model as represented by block 182 and/or an associated temperature sensor as represented by block 184. The engine/vehicle component, in this embodiment a catalyst, is monitored and managed by controlling activation of at least one cylinder in a variable displacement operating mode to control the temperature of the component. In this example, block 186 compares the catalyst temperature to a low temperature threshold. If the temperature is below the associated low temperature threshold, block 192 activates one or more deactivated cylinders to raise the temperature of the catalyst. Block 194 controls the air/fuel ratio and/or spark using open-loop, closed-loop, or a combination, to control the various cylinders as described with reference to FIG. 3 above. In one embodiment, block 192 activates an entire bank of deactivated cylinders. Preferably, control of the activated and deactivated cylinders is coordinated during reactivation such that the combined exhaust approaches a stoichiometric air/fuel ratio.

Block 188 of FIG. 4 represents comparing the catalyst temperature to an associated high temperature threshold to trigger deactivation of one or more cylinders as represented by block 190. The comparison represented by block 188 may be used to provide appropriate hysteresis to avoid hunting or cycling of the deactivated cylinders. Alternatively, or in combination, a temperature threshold may be provided as one form of component protection to reduce or prevent premature reduction of the catalyst conversion efficiency.

As such, the present invention manages the temperature of one or more engine/vehicle components such as an emission control device to maintain a desired operating efficiency while also efficiently operating the engine.

While the best mode for carrying out the invention has been described in detail, those familiar with the art to which this invention relates will recognize various alternative designs and embodiments for practicing the invention as defined by the following claims.

What is claimed:

1. A method for controlling a variable displacement internal combustion engine having cylinders grouped into two banks with associated separate upstream emission control devices, a third emission control device positioned downstream relative to one of the upstream emission control devices and a fourth emission control device positioned downstream relative to another of the upstream emission control devices, at least one bank being selectively activated and deactivated to provide variable displacement, the method comprising:

determining temperature of at least one of the emission control devices;

activating both cylinder banks when the temperature is below a low temperature threshold; and deactivating one of the cylinder banks when the temperature is above a high temperature threshold.

* * * * *